3,823,089
HEAT STORAGE COMPOSITION
John W. Ryan, 688 Nimes Road, Los Angeles, Calif. 90024, and Wallace H. Shapero, Torrance, Calif.; said Shapero assignor to said Ryan
No Drawing. Continuation-in-part of application Ser. No. 810,957, Mar. 27, 1969, now Patent No. 3,603,106. This application Aug. 2, 1971, Ser. No. 168,372
Int. Cl. C09k 3/18
U.S. Cl. 252—70
5 Claims

ABSTRACT OF THE DISCLOSURE

A heat storage composition capable of releasing heat of solidification during cooling so as to give a plateau in the cooling curve, and having excellent physical properties including stability against settling during repeated heating-cooling cycles, good heat-transfer characteristics, and relatively high latent heat; comprising a mixture of aluminum flake powder and paraffin in the relative proportions of from about 20% to 50% by weight of aluminum flake powder and from about 80% to about 50% by weight of paraffin.

---

This application is a continuation-in-part of our co-pending application, Ser. No. 810,957, filed Mar. 27, 1969, and entitled Thermodynamic Container, and now U.S. Pat. No. 3,603,106.

This invention relates to heat storage compositions exhibiting a heat transfer plateau, and having particularly desirable physical properties, and especially adapted for use in thermodynamic containers of the type disclosed in our co-pending Application Ser. No. 810,957.

It is known to utilize a heat storage material which exhibits a heat effect at a selected temperature as a result of a phase change, such as the transition from liquid to solid state. An example of such use is shown in our co-pending Application Ser. No. 810,957, which discloses a container such as a cup in which an inner compartment contains a substance which is liquid at the temperature of very hot beverage such as coffee, but which is solid below a temperature corresponding to a comfortable drinking range, such as 130° F. to 150° F., and in which the transition from the liquid to the solid state during natural cooling brings about evolution of heat of solidification, so that the cooling curve of such a cup filled with coffee or like hot beverage, when plotted as temperature as a function of time, shows a distinct plateau in the selected critical region, for example 130° F. to 150° F. That is, the rate of cooling is greatly diminished during the selected temperature interval, thus providing the beverage in its optimum drinkable state over a much longer period of time than for the case where an ordinary container such as a ceramic cup is used.

As disclosed in our aforesaid co-pending application, while a number of substances may be used to achieve the desired heat transfer plateau, a mixture of aluminum flake powder and paraffin (sometimes called "paraffin wax") within certain weight proportions gives surprisingly good results, since it provides good heat transfer throughout the mass of the composition by virtue of the presence of the aluminum particles; it gives a good plateau effect in the cooling curve by virtue of the heat of solidification of the paraffin, and surprisingly it retains its original dispersion over an indefinitely large number of heating and cooling cycles, without any appreciable settling out of the aluminum particles, apparently by virtue of the relatively low density of the aluminum flake together with its highly anisotropic configuration, and leads to a virtual interlocking of the particles, possibly for much the same reasons that similarly anisotropic colloidal clay particles will form a gel in relatively large amounts of water.

We have found that ordinary aluminum flake powder as used in aluminum paints and the like is entirely suitable. Such material shows a screen analysis of a least 99% through a 325 mesh standard screen. However, the vast majority of the particles are considerably smaller than 325 mesh. A good description of ordinary commercial aluminum flake powder, sometimes called simply "aluminum powder" is given in the book by Edwards and Wray, entitled "Aluminum Paint and Powder," Third Edition, New York, 1955. As set forth in that book, the average flake thickness of aluminum flake powders of this type is from about 5 millionths of an inch to about 50 millionths of an inch.

The paraffin is ordinary commercial paraffin, selected to have a melting point range within the desired plateau region. Thus, paraffin is available having melting point ranges from as low as 128° F. to as high as 185° F., and all of these are useful in our invention. It will be understood, of course, that the position of the plateau will vary with the melting point range selected. We prefer a mixture of about 75% by weight of paraffin having a melting point range between 133° F. and 135° F. together with about 25% of paraffin having a melting point range of between about 160° F. and about 165° F. This gives a good plateau over the range 130° F. to 150° F. when used in accordance with the invention.

The relative weight ratio of aluminum flake powder to paraffin may vary from as low as 20% aluminum with 80% paraffin to as high as 50% aluminum and 50% paraffin. Below the 20% figure just given, the mixture lacks adequate thermal conductivity. Above 50% aluminum, the crystallization of the wax appears to be inhibited, so that the establishment of a plateau is adversely affected. We find as optimum a mixture of about 45% aluminum flake powder and approximately 55% by weight of paraffin. This optimum ratio holds regardless of the melting point range selected for the paraffin. A particularly desirable paraffin mixture is as already noted, approximately three quarters by weight of paraffin having a melting point range of 130° F. to 135° F. and about one quarter of paraffin having a melting point range of 160° F. and 165° F.

The preparation of the invention compositions is readily accomplished by simply melting the paraffin in any suitable container and stirring in the aluminum flake powder, and continuing the stirring until the mixture is reasonably homogeneous. Because of the surprising self-supporting, non-settling nature of the compositions in accordance with the invention, no particular precautions need be taken subsequent to the stirring to avoid settling or segregation of the mixture.

It will be understood that we do not desire to be limited to the exact details of the composition shown and described, for obvious modifications will occur to a person skilled in the art.

Having described the invention we claim:

1. A heat storage material capable of rapidly emitting heat in its change between a liquid and solid state having the composition of from about 20% to 50% by weight of aluminum flake powder having a mesh size of at least 99% passing through a 325 mesh standard screen and from about 80% to about 50% by weight of paraffin.

2. A composition in accordance with Claim 1 in which said paraffin has a melting point within the range of about 128° F. to about 185° F.

3. A material in accordance with Claim 2 wherein said paraffin consists of a mixture of about three-quarters by weight of paraffin having a melting point range of 133° F. to about 135° F. and about one-quarter by weight of paraffin having a melting point range between about 160° F. and about 165° F.

4. The composition in accordance with Claim 2 wherein said composition is about 45% aluminum flake powder and about 55% paraffin.

5. The material in accordance with Claim 3 in which said composition is about 45% aluminum flake powder and about 55% paraffin by weight.

References Cited
UNITED STATES PATENTS

| | | | |
|---|---|---|---|
| 266,205 | 10/1882 | Roth | 252—70 |
| 1,887,618 | 11/1932 | Bell | 252—70 |
| 2,598,351 | 5/1952 | Carter | 252—70 X |
| 3,228,403 | 1/1966 | Pasternack | 252—70 X |
| 3,356,828 | 12/1967 | Furness | 252—71 X |
| 3,603,106 | 9/1971 | Ryan et al. | 62—457 |

LEON D. ROSDOL, Primary Examiner

H. A. PITLICK, Assistant Examiner

U.S. Cl. X.R.

252—71